(12) United States Patent
Cui et al.

(10) Patent No.: US 11,166,183 B2
(45) Date of Patent: *Nov. 2, 2021

(54) MEASUREMENT GAP AND SYNCHRONIZATION SIGNAL BLOCK—BASED MEASUREMENT TIMING CONFIGURATION SCHEDULING

(71) Applicant: Intel Corporation, Santa Clara, CA (US)

(72) Inventors: Jie Cui, Santa Clara, CA (US); Yang Tang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 108 days.

This patent is subject to a terminal disclaimer.

(21) Appl. No.: 16/376,692

(22) Filed: Apr. 5, 2019

(65) Prior Publication Data

US 2019/0239106 A1 Aug. 1, 2019

Related U.S. Application Data

(60) Provisional application No. 62/653,865, filed on Apr. 6, 2018.

(51) Int. Cl.
*H04W 24/10* (2009.01)
*H04W 56/00* (2009.01)
*H04W 72/04* (2009.01)
*H04W 24/08* (2009.01)

(52) U.S. Cl.
CPC ........... *H04W 24/10* (2013.01); *H04W 24/08* (2013.01); *H04W 56/001* (2013.01); *H04W 72/0453* (2013.01)

(58) Field of Classification Search
CPC ... H04W 24/08; H04W 24/10; H04W 56/001; H04W 72/0453
See application file for complete search history.

(56) References Cited

U.S. PATENT DOCUMENTS

| 2019/0052377 | A1  | 2/2019 | Hwang et al. |
| 2019/0159261 | A1* | 5/2019 | Jung ................ H04W 74/0833 |
| 2019/0246306 | A1  | 8/2019 | Fang et al. |
| 2020/0266958 | A1* | 8/2020 | Liu .................. H04W 72/0453 |
| 2020/0288337 | A1* | 9/2020 | Callender ............. H04W 24/10 |

OTHER PUBLICATIONS

NTT DOCOMO, Inc., Remaining issues on Radio link monitoring based on SSB, 3GPP TSG RAN WG4 Meeting #86, R4-1802538, Athens, Greece, Feb. 26-Mar. 2, 2018 (Year: 2018).*
3GPP, "Technical Specification Group Radio Access Network; NR; Requirements for support of radio resource management (Release 15)," 3GPP TS 38.133 V15.0.0 (Dec. 2017), 5G, 41 pages.
3GPP, "Technical Specification Group Radio Access Network; NR; Physical layer procedures for control (Release 15)," 3GPP TS 38.213 V15.0.0 (Dec. 2017), 5G, 56 pages.
United States Patent Office—Office Action dated Sep. 9, 2020 from U.S. Appl. No. 16/407,578, 12 pages.

* cited by examiner

*Primary Examiner* — Brian P Cox
(74) *Attorney, Agent, or Firm* — Schwabe, Williamson & Wyatt, P.C.

(57) ABSTRACT

Embodiments of the present disclosure address collisions and overlap between measurement gaps and synchronization signal block-based measurement time configurations. Other embodiments may be described and claimed.

10 Claims, 11 Drawing Sheets

MEASUREMENT GAP AND SYNCHRONIZATION SIGNAL BLOCK—BASED MEASUREMENT TIMING CONFIGURATION SCHEDULING

CROSS REFERENCE TO RELATED APPLICATION

The present application claims priority to U.S. Provisional Patent Application No. 62/653,865, filed Apr. 6, 2018, and entitled "Collision Solution Between Measurement Gap and SMTC." The disclosure of this provisional application is hereby incorporated by reference in its entirety.

FIELD

Embodiments of the present invention relate generally to the technical field of wireless communications.

BACKGROUND

In 5th Generation (5G) or New Radio (NR) wireless systems, synchronization signals may be transmitted in a synchronization signal block (SSB). The SSB may include primary synchronization signals (PSS), secondary synchronization signals, and a physical broadcast channel (PBCH), which may include a demodulation reference signal or data. A user equipment (UE) may be configured to perform various measurements based on the SSB. These measurements may support cell selection or reselection, handover, radio link monitoring, etc.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Figure 1:
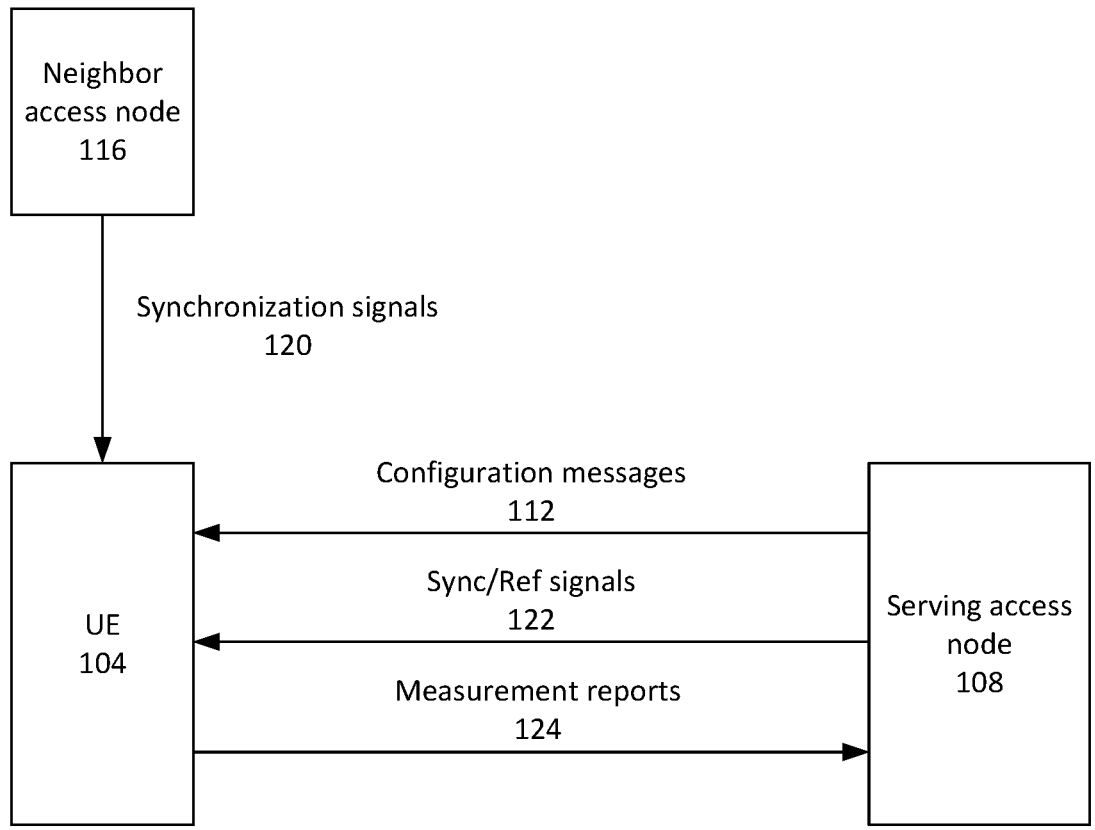
FIG. 1 illustrates a message flow between network devices in accordance with some embodiments.

FIG. 1 illustrates components of a network 100 to describe operations in connection with measurement configuration and reporting in accordance with some embodiments. Briefly, the network 100 may include a user equipment (UE) 104 communicatively coupled with a serving access node 108. The serving access node 108 may provide configuration information in one or more configuration messages 112. The configuration information may configure measurements for the UE 104 to perform. In some embodiments, the configuration information may provide information related to measurement gaps, synchronization-signal block (SSB)-based measurement timing configuration (SMTC), or a radio link monitoring (RLM) configuration.

The UE 104 may perform measurements on signals transmitted by the serving access node 108 or a neighbor access node 116. In some embodiments, the neighbor access node 116 may transmit synchronization signals 120 that the UE 104 may measure to identify a cell provided by the neighbor access node 116. In some embodiments, the serving access node 108 may transmit synchronization/reference signals 122 that the UE 104 may measure to provide the serving access node 108 with information on a quality of a connection with the serving cell.

The UE 104 may transmit measurement reports 124 with the results of the measurements to the serving access node 108. The serving access node 108 may use the results to manage one or more connections for the UE 104.

In some embodiments, the measurements performed by the UE 104 may be based on SSBs transmitted by the serving access node 108 or the neighbor access node 116. There may be five different activities that may be considered: RLM; measurement type A; measurement type B; measurement type C; and measurement type D.

RLM measurements may be performed by the UE 104 to monitor a downlink quality of a primary cell (PCell) or a primary secondary cell (PSCell) based on a reference signal (RS) transmitted by the PCell or the PSCell. RLM measurements may be performed on one or more resources that are configured for RLM by a higher layer parameter such as, RLM-RS-List parameter as defined in Third Generation Partnership Project (3GPP) Technical Specification (TS) 38.213, v15.0.0 (Jan. 3, 2018). In various embodiments, the configured RLM-RS resources may be SSBs, channel state information (CSI)-RSs, or a combination of the two.

The measurement type A may be an intra-frequency measurement without a measurement gap (MG) and without interruption. A type-A measurement may be performed by the UE 104 in the event that it is configured to measure synchronization signals 120 transmitted by the neighbor access node 116 in the same frequency range as that used for communicating with the serving access node 108. The type-A measurement may be performed outside of a measurement gap configured by the serving access node 108 and may be performed without interrupting communications with the serving access node 108. The network (for example, the access node 116) may configure the UE 104 in a manner to avoid SMTC of type-A measurements from fully overlapping with a measurement gap.

If the frequency range is in frequency range 1 (FR1), which may correspond to a frequency range from 450 MHz-6000 MHz, the UE 104 may assume there are no mixed numerologies for type A measurements. For example, the UE 104 may assume the same subcarrier spacing and symbol length used by the serving cell (provided by the serving access node 108) will be used for a target cell (provided by the neighbor access node 116).

The measurement type A may not be applicable to measurements in frequency range 2 (FR2), which may correspond to a frequency range from 24,250 MHz-52,600 MHz.

The measurement type B may be an intra-frequency measurement with interruption. A type-B measurement may be performed by the UE 104 in the event that it is configured to measure synchronization signals 120 transmitted by the neighbor access node 116 in the same frequency ranges that are used for communicating with the serving access node 108. Performance of the type-B measurement may interrupt communications with the serving access node 108.

If the frequency range is in FR1, the UE 104 may assume there are mixed numerologies for type-B measurements. For example, the UE 104 may assume a subcarrier spacing or symbol length used for communicating with the serving access node 108 will be different than the subcarrier spacing or symbol length used for communications from the neighbor access node 116.

If the frequency range is in FR2, the UE may assume that receive beam sweeping is to be used for type B measurements.

The measurement type C may be an intra-frequency measurement with a measurement gap. A type-C measurement may be performed by the UE 104 in the event that it is configured to measure synchronization signals 120 transmitted by the neighbor access node 116 in the same frequency range that is used for communicating with the serving access node 108. A type-C measurement may be performed in a measurement gap configured by the serving access node 108.

The UE 104 may perform a type-C measurement in the event it is configured to communicate with the serving access node 108 in an active bandwidth part (BWP) of a frequency range and perform a measurement, of the synchronization signals 120, for example, in the frequency range but outside of the active BWP. A BWP, as used herein, may be a contiguous set of physical resource blocks (PRBs) that form a subset of all the PRBs of a carrier bandwidth.

The measurement type D may be an inter-frequency measurement or inter-radio access technology (RAT) measurement. A type-D measurement may be performed by the UE 104 in the event that it is configured to measure synchronization signals 120 transmitted by the neighbor access node 116 in a different frequency range or using a different RAT.

Measurement scenarios that may be described herein may be based on an extent to which a network configures MG/SMTC/RLM in a manner that results in overlap between the MG and the SMTC/RLM configuration.

A first set of scenarios may include fully overlapped scenarios. For example, scenario 1a may exist when there is full overlap between MG and SMTC in type A; scenario 1b may exist when there is full overlap between MG and SMTC in type B; and scenario 1c may exist when there is full overlap between MG and RLM. No requirement may be defined for scenario 1c in some embodiments.

A second set of scenarios may include partially overlapped scenarios. For example, scenario 2a may exist when there is partial overlap between MG and SMTC in type A; scenario 2b may exist when there is partial overlap between MG and SMTC in type B; and scenario 2c may exist when there is partial overlap between MG and RLM configuration.

A third set of scenarios may include fully non-overlapped scenarios. For example, scenario 3a may exist when there is fully non-overlapped (e.g., no overlap) between MG and SMTC in type A; scenario 3b may exist when there is no overlap between MG and SMTC in type B; and scenario 3c may exist when there is no overlap between MG and RLM.

In some embodiments, a network (e.g., the serving access node 108) may configure the UE 104 to avoid certain scenarios, such as, for example, fully overlapped scenarios 1a/1b, or partially overlapped scenarios 2a/2b/2c. For example, the network (for example, access node 116) may configure the UE 104 in a manner to avoid SMTC of type-A measurement from fully overlapping with the measurement gap.

For those scenarios that are certainly to be avoided by network configuration, the corresponding requirements may not be needed in some embodiments.

In the fully non-overlapped scenario 3a, a type-A measurement may be conducted on all available SMTC occasions.

In the fully non-overlapped scenario 3c, RLM may be conducted on all available RLM-RS occasions.

If the network configures the fully non-overlapped scenario 3b for type-B measurement for small measurement gap repetition period (MGRP) cases (for example, 20 ms), the impact on the UE performance on measurement and data transmission/reception may be considered.

In some embodiments, the determination of which UE activities (for example, RLM, type A, type B, type C, or type D) for which a gap sharing table (between intra-frequency and inter-frequency measurements) may be applied.

Some embodiments may consider the following further scenarios.

Fully overlapped scenarios: scenario 1a in which all the occasions of Type A measurement are overlapped with MG; scenario 1b in which all the occasions of Type B measurement are overlapped with MG; and scenario 1c in which all the occasions of RLM are overlapped with MG.

Partial overlapped scenarios: scenario 2a in which some of occasions of Type A measurement are overlapped with MG while other occasions of Type A measurement are outside the MG; scenario 2b in which some of occasions of Type B measurement are overlapped with MG while other occasions of Type B measurement are outside the MG; and scenario 2c in which some of occasions of RLM are overlapped with MG while other occasions of RLM are outside the MG Fully non-overlapped scenarios: scenario 3a in which none of the occasions of Type A measurements are overlapped with MG; scenario 3b in which none of the occasions of Type B measurements are overlapped with MG; and scenario 3c in which none of the occasions of RLM are overlapped with MG.

Various embodiments described further herein address collisions and overlapping between measurement gap and SMTC/RLM of these and other scenarios.

Figure 2:
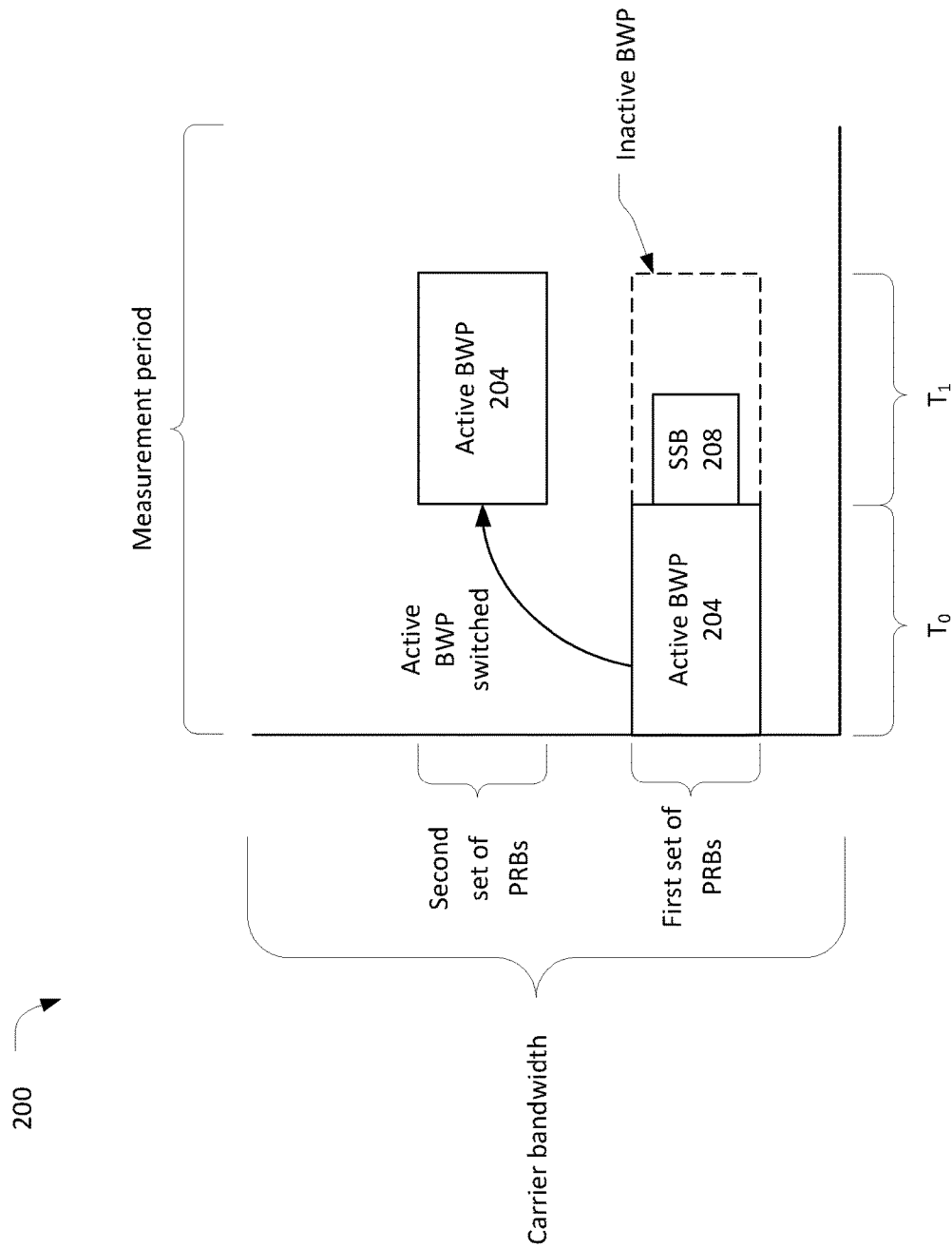
FIG. 2 illustrates a diagram of a carrier bandwidth over a measurement period in accordance with some embodiments.

FIG. 2 illustrates a diagram 200 of a carrier bandwidth over a measurement period in accordance with some embodiments. The diagram 200 may be used to facilitate discussion of embodiments of the present disclosure, but does not restrict application of these described embodiments.

The UE 104 may be initially configured by the network with an active BWP 204 that is in a first set of PRBs over a first period of time, generally referred to as $T_0$. The network configuration may change the active BWP 204 to a second set of PRBs over a second period of time, generally referred to as $T_1$. Both the first and second periods of time may be within the measurement period.

During the second period of time, the UE 104 may receive an SSB 208 from a target cell provided by, for example, the neighbor access node 116. The UE 104 may then perform an inter-frequency measurement on the SSB 208.

The diagram 200 may be considered with respect to the above-described scenarios 1a (fully overlapped between MG and SMTC in type A) and 1b (fully overlapped between MG and SMTC in type B). No requirement may be needed for scenario 1c (fully overlapped between MG and RLM) since RLM may not be required to be done in the inactive BWP (for example, the first set of PRBs during $T_1$). Furthermore, the network may configure a UE in a manner to avoid the scenario.

SSB-based, UE activities that may be considered and discussed in various embodiments may include RLM, measurement type A, measurement type B, measurement type C, and measurement type D (as described above).

As discussed above, the diagram 200 shows a situation in which a network changes the active BWP 204 during a measurement period. Different from RLM, for scenarios 1a and 1b, this situation may cause or otherwise benefit from measurement types A and B being changed to measurement type C. However, it may then be difficult to say a particular measurement is type AB or type C for this situation. Thus, some embodiments may provide that so as long as BWP is switched to not cover an intra-frequency target cell SSB frequency during the measurement period, the whole intra-frequency measurement procedure shall follow intra-frequency measurement requirement with MG. This may be the case even though RF tuning may be needed only for some of the SMTCs. Thus, for the situation shown in diagram 200, an intra-frequency measurement of SSB 208 may be considered a type-C measurement (for example, an intra-frequency measurement with measurement gap) because the active BWP 204 is switched to not cover frequencies on which the SSB 208 is transmitted.

Measurements of type A or B may be treated in the same way as RLM, since BWP in type AB will always cover the SSB frequency of the intra-frequency target cell during the entire measurement period. Thus, if the active BWP 204 covers an SSB, the UE 104 may perform the intra-frequency SSB-based measurement without a measurement gap and without an interruption (for example, the UE 104 may perform a type-A measurement) or with interruption (for example, the UE 104 may perform a type-B measurement).

In some embodiments, no requirements will be defined for scenarios 1a/1b

Some embodiments regarding partially overlapped scenarios will now be discussed. The scenarios may include, for example, scenario 2a (for example, partial overlap between MG and SMTC in type A), scenario 2b (for example, partial overlap between MG and SMTC in type B), and scenario 2c (partial overlap between MG and RLM).

For a partially overlapping case, the possibility of measurements may be summarized in the following table in which some of the possibilities may be indicated as not applicable (NA) or for consideration (FC):

TABLE 1

| FR1/FR2 | Within MG only | within/outside MG | Outside MG only |
|---|---|---|---|
| 2a (Type A) | NA for FR1 (Note-1) | FC for FR1 (Note-1) | FC for FR1 (Note-1) |
| 2b (Type B) | FC for FR1/FC for FR2 | FC for FR1/FC for FR2 | FC for FR1/FC for FR2 |
| 2c (RLM) | NA for FR1/FC for FR2 | FC for FR1/FC for FR2 | FC for FR1/FC for FR2 |

(Note-1):
There may be no Type-A measurement in FR2, hence the corresponding requirements may not needed In some embodiments, RLM/type A/type B may be completely decoupled from measurement gap (by network configuration, for example), which means they are not supposed to be conducted within the measurement gap. Thus, consideration of the specific configurations may be desired to avoid performance loss that may otherwise occur if RLM/type A/type B cannot be performed in measurement gap.

Figure 3:
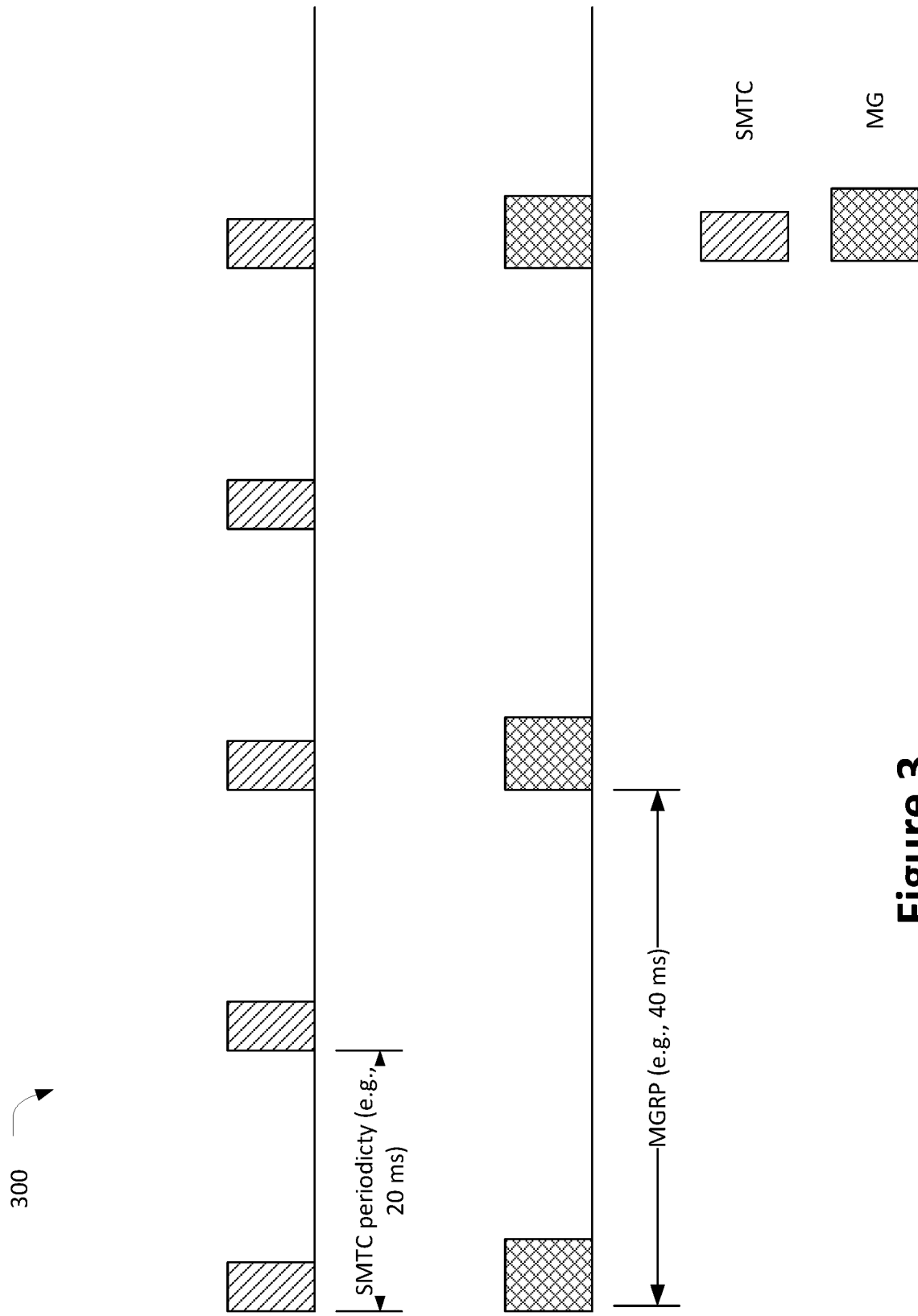
FIG. 3 illustrates a partially overlapping scenario in accordance with some embodiments.

FIG. 3 illustrates a partially overlapping scenario 300 in accordance with some embodiments. The scenario 300 may include a relatively bad case for partially overlapping in which a periodicity of an SMTC (shown as 20 ms) is half the length of a MG repetition period (MGRP) (shown as 40 ms). In this case, one SMTC out of two cannot be used for RLM/type A/type B. Consequently, if only the SMTC that is outside the MG can be used for RLM/typeA/typeB activities, then the total delay for RLM/typeA/typeB may be doubled.

In some embodiments, a max MGRP of 160 ms may be configured. Were an SMTC periodicity of 80 ms also be configured, a total delay for RLM/typeA/typeB may be based on 160 ms periodicity even though the actual SMTC periodicity would be 80 ms. Given that a configuration of an SMTC periodicity of 160 ms may be an option, appropriate configuration of the SMTC/MG may reduce adverse impact to the RLM or measurement performance. If the network wants to speed up the measurement or RLM, then network may configure smaller SMTC periodicity.

Thus, In some embodiments, if the SMTC for RLM/type A/type B is fully overlapped with MG, there may be no possibility to do RLM/type A/type B outside MG. Only if the SMTC for RLM/type A/type B is partially overlapped with MG, RLM/typeA/B can they be done outside MG. On the other hand RLM/type A/type B may be performed on the SSB within the active BWP, so no MG may be needed for RLM/type A/type B. As a result, in various embodiments, the network may configure the UE 104 in a manner such that it only conduct RLM/type A/type B measurements outside the measurement gap.

Figure 4:
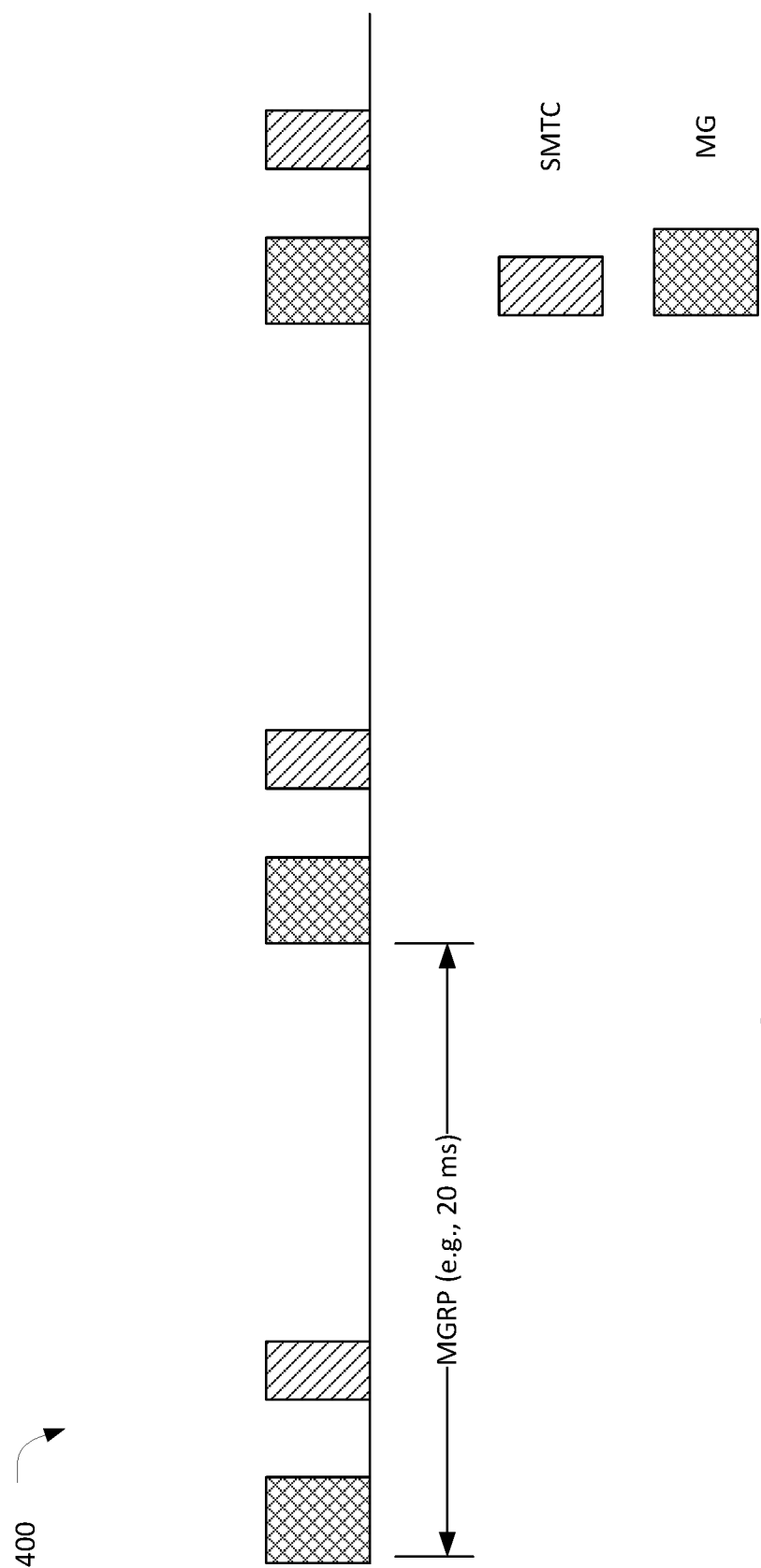
FIG. 4 illustrates a fully non-overlapping scenario in accordance with some embodiments.

FIG. 4 illustrates a fully non-overlapping scenario 400 in accordance with some embodiments. This scenario 400 may be relevant to, for example, scenario 3a (fully non-overlapped between MG and SMTC in type A), scenario 3b (fully non-overlapped between MG and SMTC in type B), or scenario 3c (fully non-overlapped between MG and RLM).

Of the fully non-overlapping scenarios, only scenario 3b may need to be considered. For example, If MGRP and MG length (MGL) configured by network is 20 ms and 6 ms respectively and type-B measurement interruption is up to SMTC window (e.g. 5 ms), then the total interruption time might be up to 11 ms. This could present a negative impact to UE data reception and transmission opportunities. It may also limit other UE activities such as RLM or measurement for beam management. Furthermore, the interruption may not only mute the PDSCH reception during the interruption period, but it may also mute the ACK/NACK reception of previous slots. As shown in FIG. 4, a large interruption time may occupy the time resource of UE intra-frequency measurement or RLM.

Because restriction of network behavior in a technical standard may be difficult, some embodiments may use an interruption ratio threshold to decide applicability of UE intra-frequency requirement. For example, some gap pattern designs may include 20 ms MGRP+6 ms MGL, as discussed above, which cause an interruption ratio 6/20=30%. If this is determined to be acceptable, various embodiment can use 6/20=30% as an interruption ratio threshold to decide if an intra-frequency measurement requirement will be applied or not.

In various embodiments, the UE/or network may determine an interruption ratio, compare the interruption ratio to a predetermined threshold (e.g., 30% in the above example), and determine applicability intra-frequency measurement requirements of the UE based on said comparison. If, for example, the interruption ratio of a given gap pattern design is greater than the threshold, the UE may not perform (and the network may not expect the UE to perform) intra-frequency measurements. Conversely, if it is determined that the interruption ratio is less than the threshold, then the network may expect the UE to perform (and the UE may perform) the intra-frequency measurements.

In some embodiments, a gap sharing mechanism may be employed for intra-frequency measurements (for example, type-C measurements) and inter-frequency measurements (for example, type-D measurements).

For example, devices may utilize a configuration table to facilitate gap sharing for intra- and inter-frequency measurements. For example, Table 2 below provides a configuration table for a value of Y, which may represent a percentage value of overlapped SMTC occasions within a measurement gap assigned for type-C measurements on a first carrier, which may be an intra-frequency carrier. The remaining (1−Y) may be a percentage value of overlapped SMTC occasions within a measurement gap assigned for type-D measurements on a second carrier, which may be an inter-frequency carrier.

TABLE 2

| Gap sharing ratio between carrier for type C and carrier for type D | Value of Y (%) |
|---|---|
| '00' | a |
| '01' | b |
| '10' | c |
| '11' | d |

For example, if Y=20, then 20% percent of SMTC occasions that are within an MG may be assigned for type-C measurements, while the remaining 80% of the SMTC occasions that are within the MG may be assigned for type-D measurements.

In some embodiments, the network may signal the value of Y to a UE in control signaling. In some embodiments, the control signaling may be broadcast to all UEs of a cell.

For example, the serving access node, for example serving access node 108, may include memory to store the configuration table. Baseband circuitry of the serving access node may select one of the values and generate one or more configuration messages with an indication of the selected value. The configuration messages may be transmitted to the UE, for example UE 104, by the control signaling.

In some embodiments, the converse of the above may be employed. For example, Y may indicate a percent of overlapped SMTC occasions within an MG that may be assigned for type-D measurements, while the other (1−Y %) of overlapped SMTC occasions within MGs may be assigned for type-C measurements.

Figure 5:
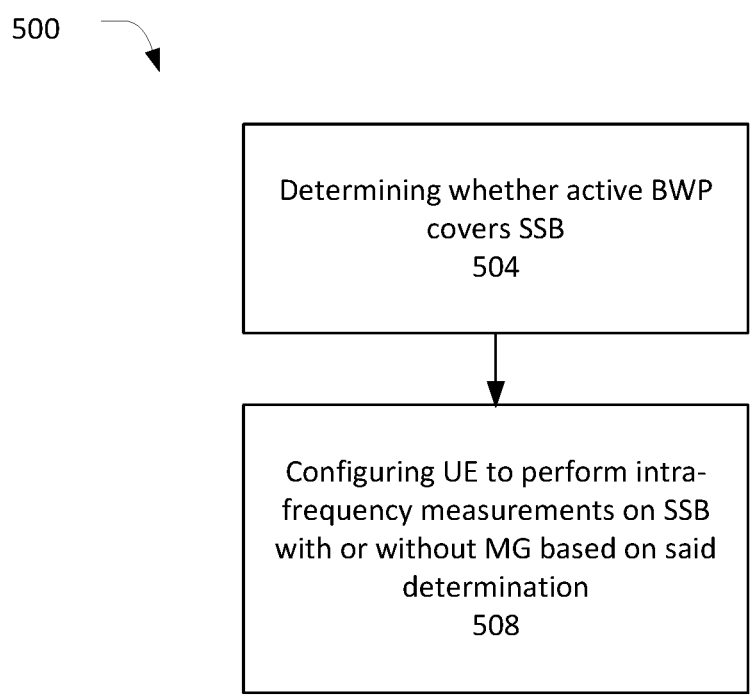
FIG. 5 illustrates an operation flow/algorithmic structure in accordance with some embodiments.

FIG. 5 illustrates an operation flow/algorithmic structure 500 in accordance with some embodiments. In some embodiments, the operation flow/algorithmic structure 500 may be performed or implemented by an access node or components thereof (for example, baseband circuitry) as described herein.

The operation flow/algorithmic structure 500 may include, at 504, determining whether an active BWP covers an SSB. For example, a serving access node may switch an active BWP, during a measurement period, from a first set of PRBs to a second set of PRBs. The serving access node may then determine whether an SSB that is to be received/measured by the UE is on the first or second set of PRBs, before/after the switch.

The operation flow/algorithmic structure 500 may further include, at 508, configuring the UE to perform intra-frequency measurements on SSB with or without MG based on the determination at 504.

In some embodiments, the configuring of the UE may include generating and causing transmission of one or more configuration messages to the UE. For example, as described above with respect to FIG. 1.

In some embodiments, the access node may configure the UE to perform the intra-frequency measurements on the SSB with a measurement gap based on a determination that the active BWP is to be switched to not cover the SSB during the measurement period. The UE may be configured to perform the measurements on the SSB as a type-C measurement.

Figure 6:
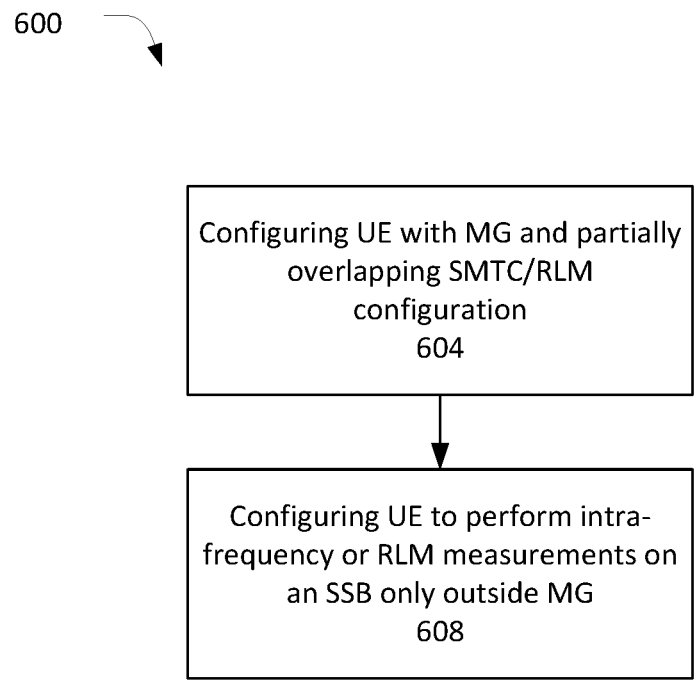
FIG. 6 illustrates an operation flow/algorithmic structure in accordance with some embodiments.

FIG. 6 illustrates an operation flow/algorithmic structure 600 in accordance with some embodiments. The operation flow/algorithmic structure 600 may be performed or implemented by an access node or components thereof (for example, baseband circuitry) as described herein.

The operation flow/algorithmic structure 600 may include, at 604, configuring a UE with MG and a partially overlapping SMCT/RLM configuration. The configuration may, as described above, be performed by the access node generating and causing transmission of one or more configuration messages to the UE.

The operation flow/algorithmic structure 600 may further include, at 608, configuring the UE to perform intra-frequency or RLM measurements on an SSB only outside the configured MG.

In some embodiments, the configurations at 604 and 608 may be performed in the same configuration messages. In other embodiments, the configurations may be performed in different configuration messages.

In some embodiments, the MG may be partially overlapped with the SMTC and the configuration messages may configure the UE to perform type-A measurements in one or more carriers within a frequency range from 450 MHz-6000 MHz.

In some embodiments, the type-A measurements may be performed on an SSB of a target cell that is to use a numerology (e.g., subcarrier spacing and symbol length) equal to that used by a serving cell of the UE.

In some embodiments, the MG may be partially overlapped with the RLM configuration and the access node may transmit the SSB outside of the measurement gap in its serving cell. The UE may measure the SSB and transmit an RLM measurement report based on the SSB.

Figure 7:
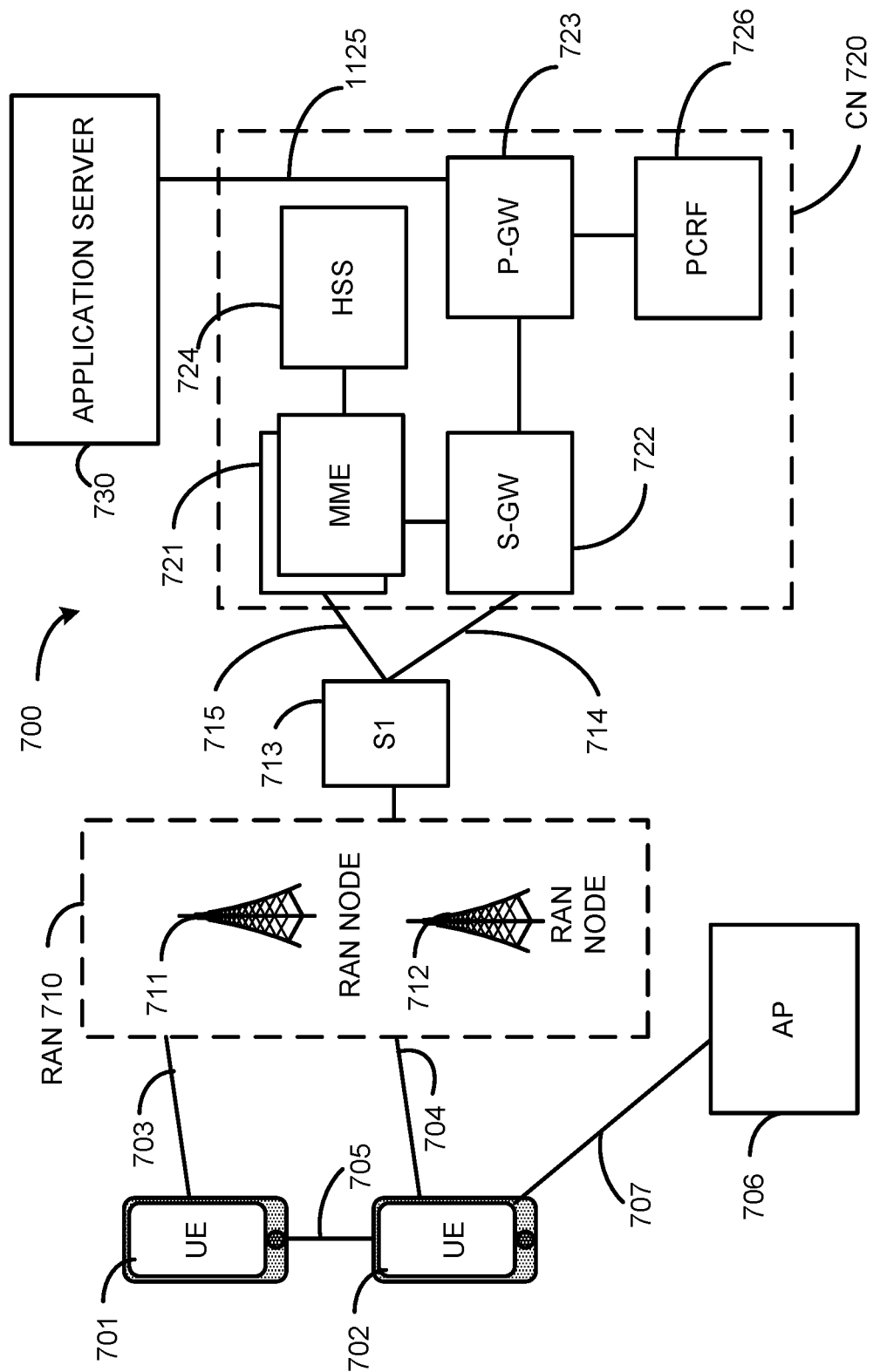
FIG. 7 illustrates an architecture of a system of a network in accordance with some embodiments.

FIG. 7 illustrates an architecture of a system 700 of a network in accordance with some embodiments. The system 700 is shown to include a user equipment (UE) 701 and a UE 702, either of which may be similar to and substantially interchangeable with UE 104.

As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs 701 and 702 are illustrated as smartphones (e.g., handheld touch-screen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or the like.

In some embodiments, any of the UEs 701 and 702 can be configured for efeMTC communication and may, in some instances, comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 701 and 702 may be configured to connect, e.g., communicatively couple, with a radio access network (RAN) 710. The RAN 710 may be, for example, an Evolved Universal Mobile Telecommunications System (UMTS) Terrestrial Radio Access Network (E-UTRAN), a NextGen RAN (NG RAN), or some other type of RAN. The UEs 701 and 702 utilize connections (or channels) 703 and 704, respectively, to communicate with RAN nodes 711 and 712. The RAN nodes may be similar to and substantially interchangeable with serving access node serving access node 108 or neighbor access node 116.

The connections 703 and 704 may each include a physical communications interface or layer (discussed in further detail infra). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information. In this example, the connections 703 and 704 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 701 and 702 may further directly exchange communication data via a ProSe interface 705. The ProSe interface 705 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH). In various implementations, the SL interface 705 may be used in vehicular applications and communications technologies, which are often referred to as V2X systems. V2X is a mode of communication where UEs (for example, UEs 701, 702) communicate with each other directly over the PC5/SL interface 705 and can take place when the UEs 701, 702 are served by RAN nodes 711, 712 or when one or more UEs are outside a coverage area of the RAN 710. V2X may be classified into four different types: vehicle-to-vehicle (V2V), vehicle to-infrastructure (V2I), vehicle-to-network (V2N), and vehicle-to-pedestrian (V2P). These V2X applications can use "co-operative awareness" to provide more intelligent services for end-users. For example, vehicle UEs (vUEs) 701, 702, RAN nodes 711, 712, application servers 730, and pedestrian UEs 701, 702 may collect knowledge of their local environment (for example, information received from other vehicles or sensor equipment in proximity) to process and share that knowledge in order to provide more intelligent services, such as cooperative collision warning, autonomous driving, and the like. In these implementations, the UEs 701, 702 may be implemented/employed as Vehicle Embedded Communications Systems (VECS) or vUEs.

The UE 702 is shown to be configured to access an access point (AP) 706 (also referred to as "WLAN node 706", "WLAN 706", "WLAN Termination 706" or "WT 706" or the like) via connection 707. The connection 707 can comprise a local wireless connection, such as a connection consistent with any IEEE 802.7 protocol, wherein the AP 706 would comprise a wireless fidelity (WiFi®) router. In this example, the AP 706 is shown to be connected to the Internet without connecting to the core network of the wireless system (described in further detail below). In various embodiments, the UE 702, RAN 710, and AP 706 may be configured to utilize LTE-WLAN aggregation (LWA) operation and/or WLAN LTE/WLAN Radio Level Integration with IPsec Tunnel (LWIP) operation. The LWA operation may involve the UE 702 in RRC_CONNECTED being configured by a RAN node 711, 712 to utilize radio resources of LTE and WLAN. LWIP operation may involve the UE 702 using WLAN radio resources (e.g., connection 707) via Internet Protocol Security (IPsec) protocol tunneling to authenticate and encrypt packets (e.g., interne protocol (IP) packets) sent over the connection 707. IPsec tunneling may include encapsulating entirety of original IP packets and adding a new packet header, thereby protecting the original header of the IP packets.

The RAN 710 can include one or more access nodes, e.g., RAN nodes 711, 712, that enable the connections 703 and 704. As used herein, the terms "access node," "access point," or the like may describe equipment that provides the radio baseband functions for data and/or voice connectivity between a network and one or more users. These access nodes can be referred to as base stations (BS), NodeBs, evolved NodeBs (eNBs), next Generation NodeBs (gNB), RAN nodes, Road Side Units (RSUs), and so forth, and can comprise ground stations (e.g., terrestrial access points) or satellite stations providing coverage within a geographic area (e.g., a cell). The term "Road Side Unit" or "RSU" may refer to any transportation infrastructure entity implemented in or by a gNB/eNB/RAN node or a stationary (or relatively stationary) UE, where an RSU implemented in or by a UE may be referred to as a "UE-type RSU", an RSU implemented in or by an eNB may be referred to as an "eNB-type RSU." The RAN 710 may include one or more RAN nodes for providing macrocells and one or more RAN nodes for providing femtocells or picocells (e.g., cells having smaller coverage areas, smaller user capacity, or higher bandwidth compared to macrocells).

Any of the RAN nodes 711 and 712 can terminate the air interface protocol and can be the first point of contact for the UEs 701 and 702. In some embodiments, any of the RAN nodes 711 and 712 can fulfill various logical functions for the RAN 710 including, but not limited to, radio network controller (RNC) functions such as radio bearer management, uplink and downlink dynamic radio resource management and data packet scheduling, and mobility management.

In accordance with some embodiments, the UEs 701 and 702 can be configured to communicate using Orthogonal Frequency-Division Multiplexing (OFDM) communication signals with each other or with any of the RAN nodes 711 and 712 over a multicarrier communication channel in accordance with various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 711 and 712 to the UEs 701 and 702, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 701 and 702. The physical downlink control channel (PDCCH) may carry information about the transport format and resource allocations related to the PDSCH channel, among other things. It may also inform the UEs 701 and 702 about the transport format, resource allocation, and H-ARQ (Hybrid Automatic Repeat Request) information related to the uplink shared channel. Typically, downlink scheduling (assigning control and shared channel resource blocks to the UE 702 within a cell) may be performed at any of the RAN nodes 711 and 712 based on channel quality information fed back from any of the UEs 701 and 702. The downlink resource assignment information may be sent on the PDCCH used for (e.g., assigned to) each of the UEs 701 and 702.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

The RAN 710 is shown to be communicatively coupled to a core network (CN) 720 via an S1 interface 713. In embodiments, the CN 720 may be an evolved packet core (EPC) network, a NextGen Packet Core (NPC) network, or some other type of CN. In this embodiment the S1 interface 713 is split into two parts: the S1-U interface 714, which carries traffic data between the RAN nodes 711 and 712 and the serving gateway (S-GW) 722, and the S1-mobility management entity (MME) interface 710, which is a signaling interface between the RAN nodes 711 and 712 and MMEs 721.

In this embodiment, the CN 720 comprises the MMEs 721, the S-GW 722, the Packet Data Network (PDN) Gateway (P-GW) 723, and a home subscriber server (HSS) 724. The MMEs 721 may be similar in function to the control plane of legacy Serving General Packet Radio Service (GPRS) Support Nodes (SGSN). The MMEs 721 may manage mobility aspects in access such as gateway selection and tracking area list management. The HSS 724 may comprise a database for network users, including subscription-related information to support the network entities' handling of communication sessions. The CN 720 may comprise one or several HSSs 724, depending on the number of mobile subscribers, on the capacity of the equipment, on the organization of the network, etc. For example, the HSS 724 can provide support for routing/roaming, authentication, authorization, naming/addressing resolution, location dependencies, etc.

The S-GW 722 may terminate the S1 interface 713 towards the RAN 710, and routes data packets between the RAN 710 and the CN 720. In addition, the S-GW 722 may be a local mobility anchor point for inter-RAN node handovers and also may provide an anchor for inter-3GPP mobility. Other responsibilities may include lawful intercept, charging, and some policy enforcement.

The P-GW 723 may terminate an SGi interface toward a PDN. The P-GW 723 may route data packets between the EPC network 720 and external networks such as a network including the application server 730 (alternatively referred to as application function (AF)) via an Internet Protocol (IP) interface 725. Generally, the application server 730 may be an element offering applications that use IP bearer resources with the core network (e.g., UMTS Packet Services (PS) domain, LTE PS data services, etc.). In this embodiment, the P-GW 723 is shown to be communicatively coupled to an application server 730 via an IP communications interface 725. The application server 730 can also be configured to support one or more communication services (e.g., Voice-over-Internet Protocol (VoIP) sessions, PTT sessions, group communication sessions, social networking services, etc.) for the UEs 701 and 702 via the CN 720.

The P-GW 723 may further be a node for policy enforcement and charging data collection. Policy and Charging Rules Function (PCRF) 726 is the policy and charging control element of the CN 720. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 726 may be communicatively coupled to the application server 730 via the P-GW 723. The application server 730 may signal the PCRF 726 to indicate a new service flow and select the appropriate Quality of Service (QoS) and charging parameters. The PCRF 726 may provision this rule into a Policy and Charging Enforcement Function (PCEF) (not shown) with the appropriate traffic flow template (TFT) and QoS class of identifier (QCI), which commences the QoS and charging as specified by the application server 730.

Figure 8:
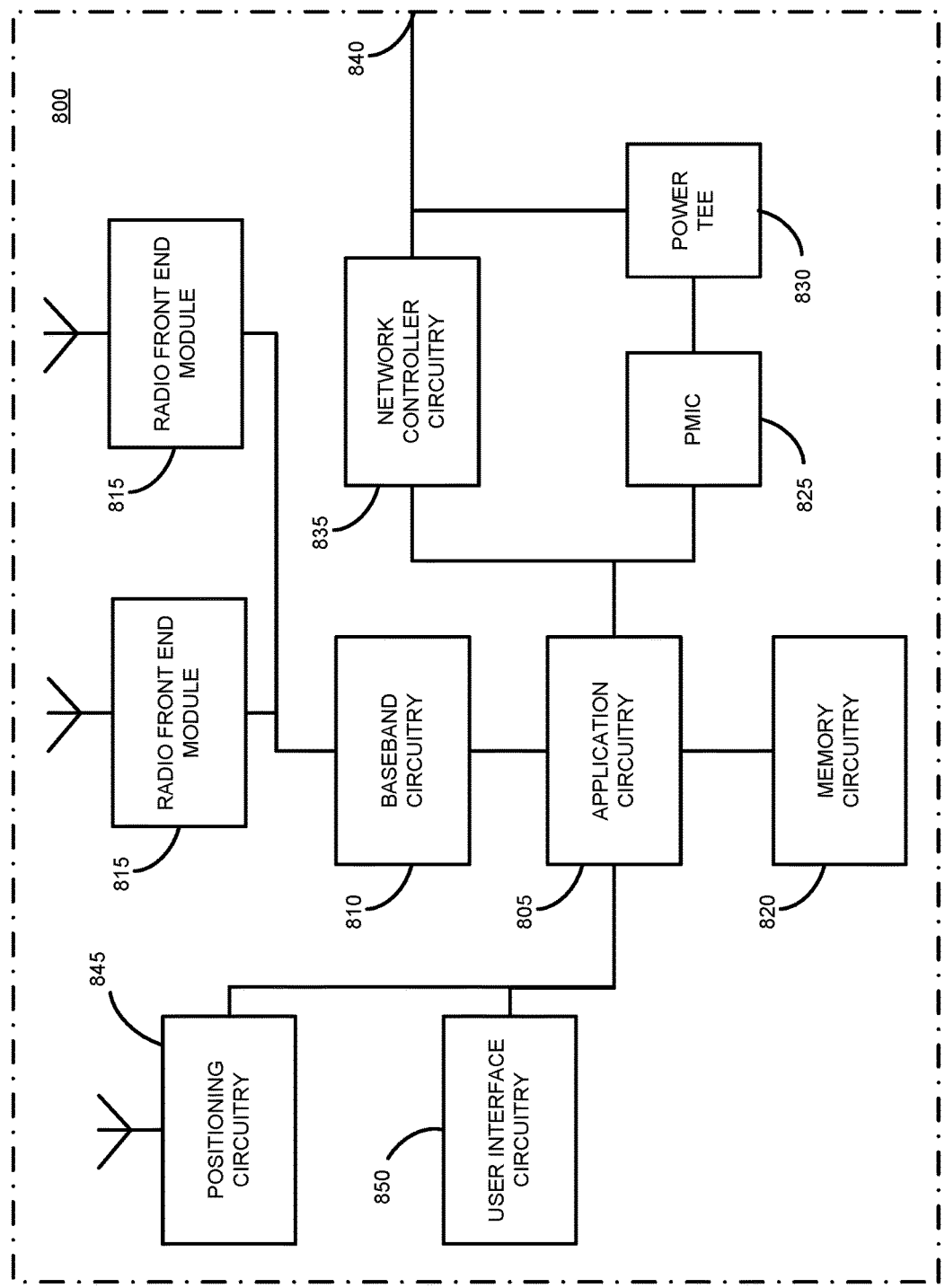
FIG. 8 illustrates an example of an infrastructure equipment in accordance with various embodiments.

FIG. 8 illustrates an example of infrastructure equipment 800 in accordance with various embodiments. The infrastructure equipment 800 (or "system 800") may be implemented as a base station, radio head, RAN node, etc., such as the RAN nodes 711 and 712, and/or AP 706 shown and described previously. In other examples, the system 800 could be implemented in or by a UE, application server(s) 730, and/or any other element/device discussed herein. The system 800 may include one or more of application circuitry 805, baseband circuitry 810, one or more radio front end modules 810, memory 820, power management integrated circuitry (PMIC) 825, power tee circuitry 830, network controller 835, network interface connector 840, satellite positioning circuitry 845, and user interface 850. In some embodiments, the device 900 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuitry" and/or "baseband circuitry" may be considered synonymous to, and may be referred to as "processor circuitry." As used herein, the term "processor circuitry" may refer to, is part of, or includes circuitry capable of sequentially and automatically carrying out a sequence of arithmetic or logical operations; and recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Furthermore, the various components of the core network 720 may be referred to as "network elements." The term "network element" may describe a physical or virtualized equipment used to provide wired or wireless communication network services. The term "network element" may be considered synonymous to and/or referred to as a networked computer, networking hardware, network equipment, network node, router, switch, hub, bridge, radio network controller, radio access network device, gateway, server, virtualized network function (VNF), network functions virtualization infrastructure (NFVI), and/or the like.

Application circuitry 805 may include one or more central processing unit (CPU) cores and one or more of cache memory, low drop-out voltage regulators (LDOs), interrupt controllers, serial interfaces such as SPI, $I^2C$ or universal programmable serial interface module, real time clock (RTC), timer-counters including interval and watchdog timers, general purpose input/output (I/O or IO), memory card controllers such as Secure Digital (SD/)MultiMediaCard (MMC) or similar, Universal Serial Bus (USB) interfaces, Mobile Industry Processor Interface (MIPI) interfaces and Joint Test Access Group (JTAG) test access ports. As examples, the application circuitry 805 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the system 800 may not utilize application circuitry 805, and instead may include a special-purpose processor/controller to process IP data received from an EPC or SGC, for example.

Additionally or alternatively, application circuitry 805 may include circuitry such as, but not limited to, one or more field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 805 may comprise logic blocks or logic fabric including other interconnected resources that may be programmed to perform various functions, such as the procedures, methods, functions, etc. of the various embodiments discussed herein. In such embodiments, the circuitry of application circuitry 805 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in lookup-tables (LUTs) and the like.

The baseband circuitry 810 may be implemented, for example, as a solder-down substrate including one or more integrated circuits, a single packaged integrated circuit soldered to a main circuit board or a multi-chip module containing two or more integrated circuits. Although not shown, baseband circuitry 810 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 810 may include protocol processing circuitry with one or more instances of control circuitry (not shown) to provide control functions for the digital baseband circuitry and/or radio frequency circuitry (for example, the radio front end modules 810).

User interface circuitry 850 may include one or more user interfaces designed to enable user interaction with the system 800 or peripheral component interfaces designed to enable peripheral component interaction with the system 800. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a non-volatile memory port, a universal serial bus (USB) port, an audio jack, a power supply interface, etc.

The radio front end modules (RFEMs) 810 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 810. The RFEMs 810 may incorporate both millimeter wave antennas and sub-millimeter wave antennas.

The memory circuitry 820 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAIVI), etc., and may incorporate the three-dimensional (3D) cross-point (XPOINT) memories from Intel® and Micron®. Memory circuitry 820 may be implemented as one or more of solder down packaged integrated circuits, socketed memory modules and plug-in memory cards.

The PMIC 825 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 830 may provide for electrical power drawn from a network cable to provide both power supply and data connectivity to the infrastructure equipment 800 using a single cable.

The network controller circuitry 835 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 800 via network interface connector 840 using a physical connection, which may be electrical (commonly referred to as a "copper interconnect"), optical, or wireless. The network controller circuitry 835 may include one or more dedicated processors and/or FPGAs to communicate using one or more of the aforementioned protocol. In some implementations, the network controller circuitry 835 may include multiple controllers to provide connectivity to other networks using the same or different protocols.

The positioning circuitry 845 may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 845 may comprise various hardware elements (e.g., including hardware devices such as switches, filters, amplifiers, antenna elements, and the like to facilitate the communications over-the-air (OTA) communications) to communicate with components of a positioning network, such as navigation satellite constellation nodes.

Nodes or satellites of the navigation satellite constellation(s) ("GNSS nodes") may provide positioning services by continuously transmitting or broadcasting GNSS signals along a line of sight, which may be used by GNSS receivers (e.g., positioning circuitry 845 and/or positioning circuitry implemented by UEs 701, 702, or the like) to determine their GNSS position. The GNSS signals may include a pseudo-random code (e.g., a sequence of ones and zeros) that is known to the GNSS receiver and a message that includes a time of transmission (ToT) of a code epoch (e.g., a defined point in the pseudorandom code sequence) and the GNSS node position at the ToT. The GNSS receivers may monitor/measure the GNSS signals transmitted/broadcasted by a plurality of GNSS nodes (e.g., four or more satellites) and solve various equations to determine a corresponding GNSS position (e.g., a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (e.g., an offset of the GNSS receiver clock relative to the GNSS node time). In some embodiments, the positioning circuitry 845 may include a Micro-Technology for Positioning, Navigation, and Timing (Micro-PNT) IC that uses a master timing clock to perform position tracking/estimation without GNSS assistance.

The GNSS receivers may measure the time of arrivals (ToAs) of the GNSS signals from the plurality of GNSS nodes according to its own clock. The GNSS receivers may determine time of flight (ToF) values for each received GNSS signal from the ToAs and the ToTs, and then may determine, from the ToFs, a three-dimensional (3D) position and clock deviation. The 3D position may then be converted into a latitude, longitude and altitude. The positioning circuitry 845 may provide data to application circuitry 805, which may include one or more of position data or time data. Application circuitry 805 may use the time data to synchronize operations with other radio base stations (e.g., RAN nodes 711, 712, or the like).

The components shown by FIG. 8 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an $I^2C$ interface, an SPI interface, point to point interfaces, and a power bus, among others.

Figure 9:
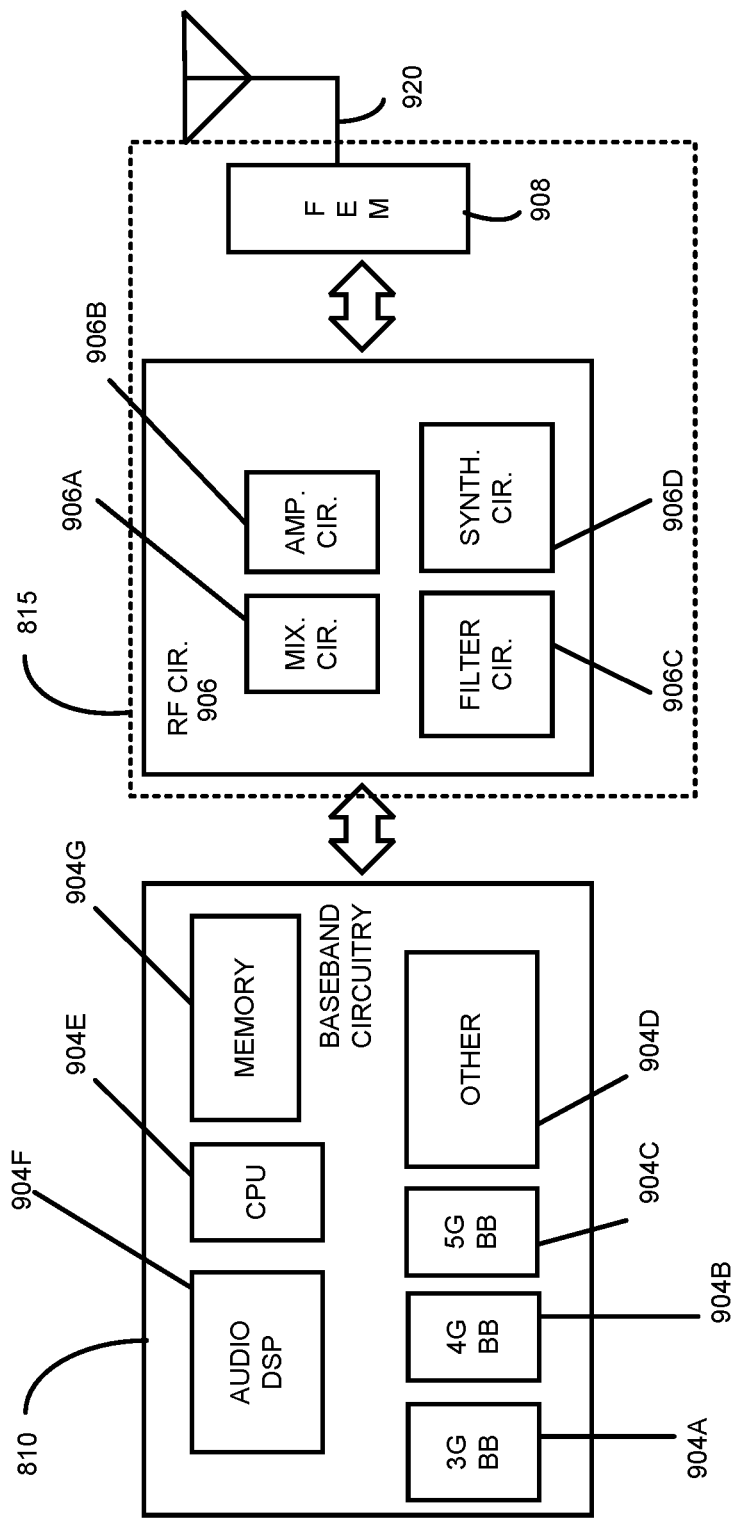
FIG. 9 illustrates example components of baseband circuitry and radio front end modules in accordance with various embodiments.

FIG. 9 illustrates example components of baseband circuitry 810 and radio front end modules (RFEM) 815 in accordance with some embodiments. As shown, the RFEM 815 may include Radio Frequency (RF) circuitry 906, front-end module (FEM) circuitry 908, one or more antennas 90 coupled together at least as shown.

The baseband circuitry 810 may include circuitry such as, but not limited to, one or more single-core or multi-core processors. The baseband circuitry 810 may include one or more baseband processors or control logic to process baseband signals received from a receive signal path of the RF circuitry 906 and to generate baseband signals for a transmit signal path of the RF circuitry 906. Baseband processing circuitry 810 may interface with the application circuitry for generation and processing of the baseband signals and for controlling operations of the RF circuitry 906. For example, in some embodiments, the baseband circuitry 810 may include a third generation (3G) baseband processor 904A, a fourth generation (4G) baseband processor 904B, a fifth generation (5G) baseband processor 904C, or other baseband processor(s) 904D for other existing generations, generations in development or to be developed in the future (e.g., second generation (2G), sixth generation (6G), etc.). The baseband circuitry 810 (e.g., one or more of baseband processors 904A-D) may handle various radio control functions that enable communication with one or more radio networks via the RF circuitry 906. In other embodiments, some or all of the functionality of baseband processors 904A-D may be included in modules stored in the memory 904G and executed via a Central Processing Unit (CPU) 904E. The radio control functions may include, but are not limited to, signal modulation/demodulation, encoding/decoding, radio frequency shifting, etc. In some embodiments, modulation/demodulation circuitry of the baseband circuitry 810 may include Fast-Fourier Transform (FFT), precoding, or constellation mapping/demapping functionality. In some embodiments, encoding/decoding circuitry of the baseband circuitry 810 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 810 may include one or more audio digital signal processor(s) (DSP) 904F. The audio DSP(s) 904F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 810 and the application circuitry 805/905 may be implemented together such as, for example, on a system on a chip (SoC).

In some embodiments, the baseband circuitry 810 may provide for communication compatible with one or more radio technologies. For example, in some embodiments, the baseband circuitry 810 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 810 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. RF circuitry 906 may include a receive signal path which may include circuitry to down-convert RF signals received from the FEM circuitry 908 and provide baseband signals to the baseband circuitry 810. RF circuitry 906 may also include a transmit signal path which may include circuitry to up-convert baseband signals provided by the baseband circuitry 810 and provide RF output signals to the FEM circuitry 908 for transmission.

In some embodiments, the receive signal path of the RF circuitry 906 may include mixer circuitry 906a, amplifier circuitry 906b and filter circuitry 906c. In some embodiments, the transmit signal path of the RF circuitry 906 may include filter circuitry 906c and mixer circuitry 906a. RF circuitry 906 may also include synthesizer circuitry 906d for synthesizing a frequency for use by the mixer circuitry 906a of the receive signal path and the transmit signal path. In some embodiments, the mixer circuitry 906a of the receive signal path may be configured to down-convert RF signals received from the FEM circuitry 908 based on the synthesized frequency provided by synthesizer circuitry 906d. The amplifier circuitry 906b may be configured to amplify the down-converted signals and the filter circuitry 906c may be a low-pass filter (LPF) or band-pass filter (BPF) configured to remove unwanted signals from the down-converted signals to generate output baseband signals. Output baseband signals may be provided to the baseband circuitry 810 for further processing. In some embodiments, the output baseband signals may be zero-frequency baseband signals, although this is not a requirement. In some embodiments, mixer circuitry 906a of the receive signal path may comprise passive mixers, although the scope of the embodiments is not limited in this respect.

In some embodiments, the mixer circuitry 906a of the transmit signal path may be configured to up-convert input baseband signals based on the synthesized frequency provided by the synthesizer circuitry 906d to generate RF output signals for the FEM circuitry 908. The baseband signals may be provided by the baseband circuitry 810 and may be filtered by filter circuitry 906c.

In some embodiments, the mixer circuitry 906a of the receive signal path and the mixer circuitry 906a of the transmit signal path may include two or more mixers and may be arranged for quadrature downconversion and upconversion, respectively. In some embodiments, the mixer circuitry 906a of the receive signal path and the mixer circuitry 906a of the transmit signal path may include two or more mixers and may be arranged for image rejection (e.g., Hartley image rejection). In some embodiments, the mixer circuitry 906a of the receive signal path and the mixer circuitry 906a may be arranged for direct downconversion and direct upconversion, respectively. In some embodiments, the mixer circuitry 906a of the receive signal path and the mixer circuitry 906a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 810 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906d may be a fractional-N synthesizer or a fractional N/N+1 synthesizer, although the scope of the embodiments is not limited in this respect as other types of frequency synthesizers may be suitable. For example, synthesizer circuitry 906d may be a delta-sigma synthesizer, a frequency multiplier, or a synthesizer comprising a phase-locked loop with a frequency divider.

The synthesizer circuitry 906d may be configured to synthesize an output frequency for use by the mixer circuitry 906a of the RF circuitry 906 based on a frequency input and a divider control input. In some embodiments, the synthesizer circuitry 906d may be a fractional N/N+1 synthesizer.

In some embodiments, frequency input may be provided by a voltage controlled oscillator (VCO), although that is not a requirement. Divider control input may be provided by either the baseband circuitry 810 or the applications processor depending on the desired output frequency. In some embodiments, a divider control input (e.g., N) may be determined from a look-up table based on a channel indicated by the applications processor 805/905.

Synthesizer circuitry 906d of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path which may include circuitry configured to operate on RF signals received from one or more antennas 90, amplify the received signals and provide the amplified versions of the received signals to the RF circuitry 906 for further processing. FEM circuitry 908 may also include a transmit signal path which may include circuitry configured to amplify signals for transmission provided by the RF circuitry 906 for transmission by one or more of the one or more antennas 90. In various embodiments, the amplification through the transmit or receive signal paths may be done solely in the RF circuitry 906, solely in the FEM 908, or in both the RF circuitry 906 and the FEM 908.

In some embodiments, the FEM circuitry 908 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission (e.g., by one or more of the one or more antennas 90).

Processors of the application circuitry and processors of the baseband circuitry 810 may be used to execute elements of one or more instances of a protocol stack. For example, processors of the baseband circuitry 810, alone or in combination, may be used execute Layer 3, Layer 2, or Layer 1 functionality, while processors of the baseband circuitry 810 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 10:
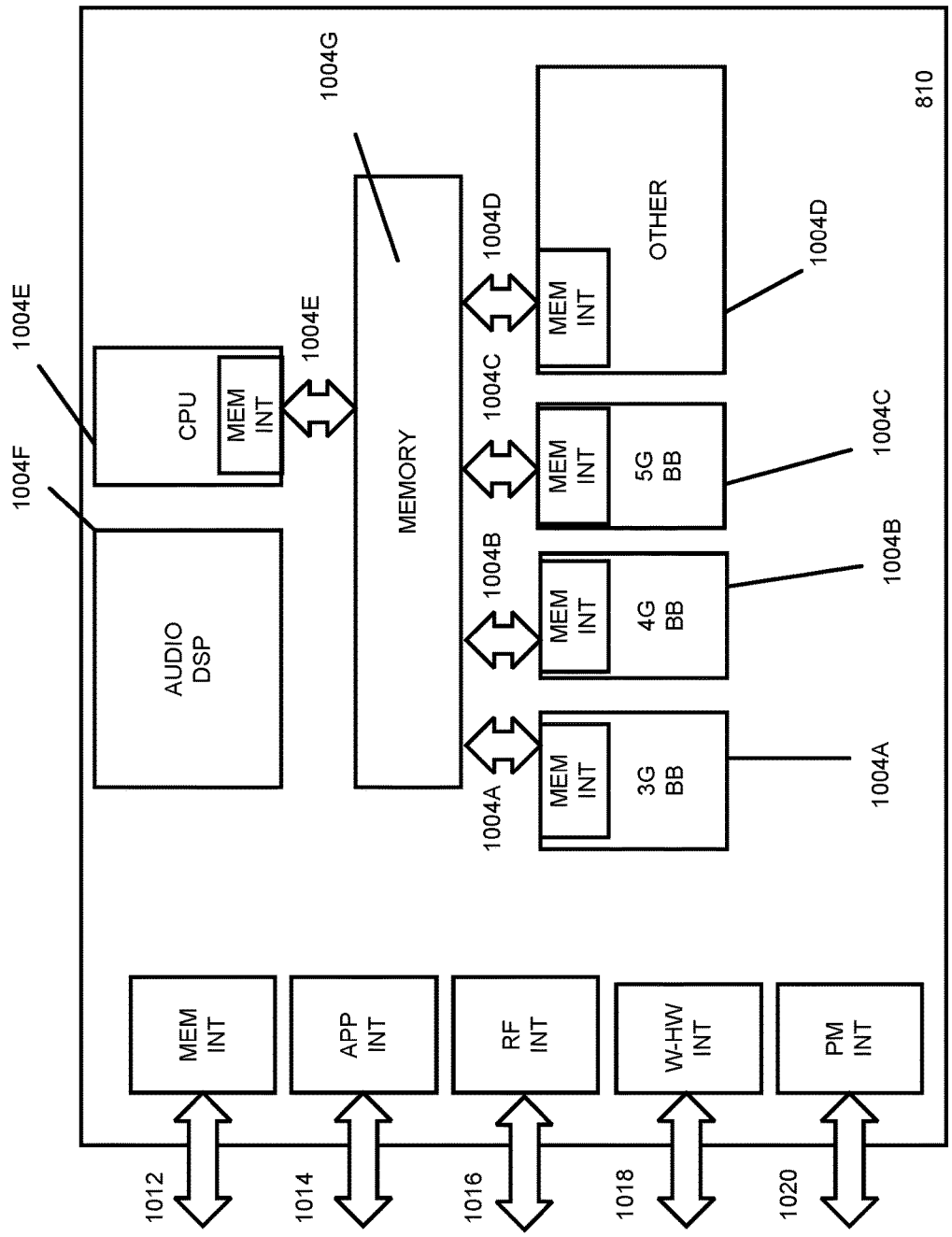
FIG. 10 illustrates example interfaces of baseband circuitry in accordance with various embodiments.

FIG. 10 illustrates example interfaces of baseband circuitry in accordance with some embodiments. As discussed above, the baseband circuitry 810 of FIGS. 8-9 may comprise processors 904A-904E and a memory 904G utilized by said processors. Each of the processors 904A-904E may include a memory interface, 1004A-1004E, respectively, to send/receive data to/from the memory 904G.

The baseband circuitry 810 may further include one or more interfaces to communicatively couple to other circuitries/devices, such as a memory interface 108 (e.g., an interface to send/receive data to/from memory external to the baseband circuitry 810), an application circuitry interface 1014 (e.g., an interface to send/receive data to/from the application circuitry 805 of FIG. 8), an RF circuitry interface 1016 (e.g., an interface to send/receive data to/from RF circuitry 906 of FIG. 9), a wireless hardware connectivity interface 1018 (e.g., an interface to send/receive data to/from Near Field Communication (NFC) components, Bluetooth® components (e.g., Bluetooth® Low Energy), Wi-Fi® components, and other communication components), and a power management interface 1020 (e.g., an interface to send/receive power or control signals to/from a PMIC.

Figure 11:
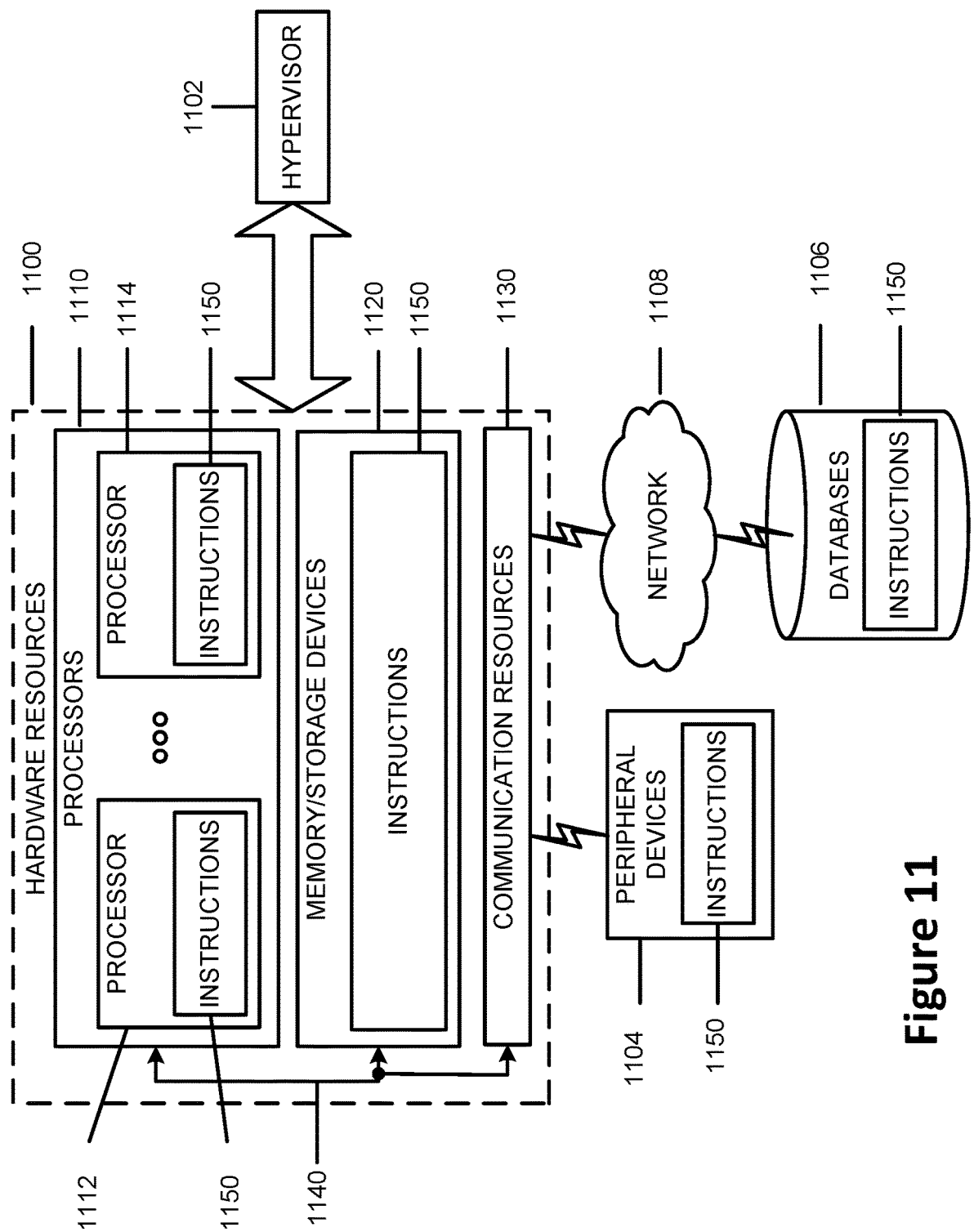
FIG. 11 is a block diagram illustrating components, according to some example embodiments, able to read instructions from a machine-readable or computer-readable medium (e.g., a non-transitory machine-readable storage medium) and perform any one or more of the methodologies discussed herein.

FIG. 11 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1100 including one or more processors (or processor cores) 1110, one or more memory/storage devices 1120, and one or more communication resources 1130, each of which may be communicatively coupled via a bus 1140. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor 1102 may be executed to provide an execution environment for one or more network slices/sub-slices to utilize the hardware resources 1100. A "virtualized resource" may refer to compute, storage, and/or network resources provided by virtualization infrastructure to an application, device, system, etc.

The processors 1110 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 118 and a processor 1114.

The memory/storage devices 1120 may include main memory, disk storage, or any suitable combination thereof. The memory/storage devices 1120 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1130 may include interconnection or network interface components or other suitable devices to communicate with one or more peripheral devices 1104 or one or more databases 1106 via a network 1108. For example, the communication resources 1130 may include wired communication components (e.g., for coupling via a Universal Serial Bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 1150 may comprise software, a program, an application, an applet, an app, or other executable code for causing at least any of the processors 1110 to perform any one or more of the methodologies discussed herein. The instructions 1150 may reside, completely or partially, within at least one of the processors 1110 (e.g., within the processor's cache memory), the memory/storage devices 1120, or any suitable combination thereof. Furthermore, any portion of the instructions 1150 may be transferred to the hardware resources 1100 from any combination of the peripheral devices 1104 or the databases 1106. Accordingly, the memory/storage devices of processors 1110, the memory/storage devices 1120, the peripheral devices 1104, and the databases 1106 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include a method of operating an access node, the method comprising: determining whether an active bandwidth part (BWP) to be used by a user equipment (UE) is to cover a synchronization signal block (SSB) that is to serve as a basis for a measurement performed by the UE within a measurement period; and generating and causing transmission of one or more configuration messages to configure the UE to perform intra-frequency measurements on the SSB with or without a measurement gap based on said determination of whether the active BWP is to cover the SSB.

Example 2 may include the method of example 1 or some other example herein, further comprising: generating and causing transmission of the one or more configuration messages to configure the UE to perform the intra-frequency measurements on the SSB with a measurement gap based on a determination that the active BWP is to be switched to not cover the SSB during the measurement period.

Example 3 may include the method of example 2 or some other example herein, wherein the one or more configuration messages are to configure the UE to perform the intra-frequency measurements on the SSB as a type-C measurement.

Example 4 may include the method of example 2 or some other example herein, wherein the active BWP is on a first set of physical resource blocks (PRBs) for a first time period and a second set of PRBs for a second time period, and the SSB is on PRBs within the first set of PRBs within the second time period.

Example 5 may include the method of example 1 or some other example herein, further comprising: generating and causing transmission of the one or more configuration messages to configure the UE to perform the intra-frequency measurements on the SSB without a measurement gap based on a determination that the active BWP is to cover the SSB during the measurement period.

Example 6 may include the method of example 1 or some other example herein, wherein the one or more configuration messages are to configure the UE to avoid radio link monitoring in an inactive bandwidth part.

Example 7 may include the method of example 1 or some other example herein, wherein the one or more configuration messages are to configure the UE to perform measurements of type A or B on the SSB within the active BWP.

Example 8 may include a method of operating an access node, the method comprising: generating one or more configuration messages with information to configure a user equipment (UE) with a measurement gap (MG) and SSB-based measurement timing configuration or radio link monitoring (RLM) configuration, wherein the MG is partially overlapped with the SMTC or RLM configuration, and the information is to further configure the UE to perform intra-frequency or RLM measurements on an SSB only outside of the measurement gap; and causing the one or more configuration messages to be transmitted to the UE.

Example 9 may include the method of example 8 or some other example herein, wherein the MG is partially overlapped with the SMTC and the one or more configuration messages are to configure the UE to perform type-A measurements in one or more carriers within a frequency range from 450 MHz-6000 MHz.

Example 10 may include the method of example 9 or some other example herein A measurements are to be performed on an SSB of a target cell that is to use a subcarrier spacing and symbol length equal to a subcarrier spacing and symbol length used by a serving cell of the UE.

Example 11 may include the method of example 8 or some other example herein, wherein the MG is partially overlapped with the RLM configuration and the method further comprises: transmitting or causing transmission of the SSB outside of the measurement gap in a serving cell; and receiving an RLM measurement report from the UE based on the SSB.

Example 12 may include the method of example 8 or some other example herein, wherein the MG is partially overlapped with the SMTC, the SSB is to be transmitted by a neighbor access node in a target cell, and the one or more configuration messages are to configure the UE to perform type-B measurements.

Example 13 may include the method of example 12 or some other example herein, wherein the target cell is to operate in a frequency range from 450 MHz-6000 MHz or 24,250 MHz-52,600 MHz.

Example 14 may include a method comprising: determining whether an active bandwidth part (BWP) to be used by a user equipment (UE) is to cover a synchronization signal block (SSB) that is to serve as a basis for a measurement performed by the UE within a measurement period; and generating one or more configuration messages to configure the UE to perform intra-frequency measurements on the SSB with or without a measurement gap based on said determination of whether the active BWP is to cover the SSB; and transmitting the one or more configuration message to the UE.

Example 15 may include the method of example 14 or some other example herein, wherein the one or more configuration messages are to configure the UE to perform the intra-frequency measurements as type-C measurements on the SSB with a measurement gap based on a determination that the active BWP is to be switched to not cover the SSB during the measurement period.

Example 16 may include the method of example 15 or some other example herein, wherein the active BWP is on a first set of physical resource blocks (PRBs) for a first time period and a second set of PRBs for a second time period, and the SSB is on PRBs within the first set of PRBs within the second time period.

Example 17 may include a method comprising: determining a total interruption time based on a measurement gap repetition period (MGRP), measurement gap length (MGL), and a length of a synchronization signal block-based measurement time configuration (SMTC) window; and determining intra-frequency measurements for a user equipment based on said determination of the total interruption time.

Example 18 may include the method of example 17 or some other example herein, further comprising: comparing the total interruption time to a predetermined threshold; and determining whether the UE is to perform intra-frequency measurements based on said comparison.

Example 19 may include the method of example 18 or some other example herein, further comprising: determining the total interruption time is less than a predetermined threshold; and determining the UE is to perform intra-frequency measurements based on said determination that the total interruption time is less than the predetermined threshold.

Example 20 may include a method comprising: storing a configuration table having a plurality of values that represent percentage values of overlapped synchronization signal block-based measurement time configuration (SMTC) occasions within a measurement gap for first types of measurements; selecting a value (Y) from the plurality of values; generating one or more configuration messages with an indication of the selected value; and transmitting the one or more configuration messages to a user equipment (UE).

Example 21 may include the method of example 20 or some other example herein, wherein the value is to indicate a corresponding percentage value of overlapped SMTC occasions within a measurement gap that are to be assigned for type-C measurements on a first carrier.

Example 22 may include the method of example 19 or some other example herein, wherein a remaining portion of the SMTC occasions that are within the measurement gap are to be assigned for type-D measurements Example 23 may include one or more non-transitory computer-readable media comprising instructions to cause an electronic device, upon execution of the instructions by one or more processors of the electronic device, to perform one or more elements of a method described in or related to any of examples 1-22, or any other method or process described herein.

Example 24 may include an apparatus comprising logic, modules, or circuitry to perform one or more elements of a method described in or related to any of examples 1-22, or any other method or process described herein.

Example 25 may include a method, technique, or process as described in or related to any of examples 1-22, or portions or parts thereof.

Example 26 may include an apparatus comprising: one or more processors and one or more computer readable media comprising instructions that, when executed by the one or more processors, cause the one or more processors to perform the method, techniques, or process as described in or related to any of examples 1-22, or portions thereof.

Example 27 may include a signal as described in or related to any of examples 1-22, or portions or parts thereof.

Example 28 may include a signal in a wireless network as shown and described herein.

Example 29 may include a method of communicating in a wireless network as shown and described herein.

Example 30 may include a system for providing wireless communication as shown and described herein.

Example 31 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. One or more non-transitory, computer-readable media having instructions that, when executed by one or more processors, cause a next-generation NodeB (gNB) to:
    identify an active bandwidth part (BWP) to be used by a user equipment (UE);
    determine whether the active BWP is to cover a synchronization signal block (SSB) to be transmitted by a target cell and that is to serve as a basis for a measurement performed by the UE within a measurement period; and
    generate and cause transmission of one or more configuration messages to configure the UE to perform intra-frequency measurements on the SSB with or without a measurement gap based on the determination of whether the active BWP is to cover the SSB transmitted by the target cell.

2. The one or more non-transitory, computer-readable media of claim 1, wherein the instructions, when executed, further cause the gNB to: generate and cause transmission of the one or more configuration messages to configure the UE to perform the intra-frequency measurements on the SSB with a measurement gap based on a determination that the active BWP is to be switched to not cover the SSB during the measurement period.

3. The one or more non-transitory, computer-readable media of claim 2, wherein the one or more configuration messages are to configure the UE to perform the intra-frequency measurements on the SSB as a type-C measurement.

4. The one or more non-transitory, computer-readable media of claim 2, wherein the active BWP is on a first set of physical resource blocks (PRBs) for a first time period and a second set of PRBs for a second time period, and the SSB is on PRBs within the first set of PRBs within the second time period.

5. The one or more non-transitory, computer-readable media of claim 1, wherein the instructions, when executed, further cause the gNB to: generate and cause transmission of the one or more configuration messages to configure the UE to perform the intra-frequency measurements on the SSB without a measurement gap based on a determination that the active BWP is to cover the SSB during the measurement period.

6. The one or more non-transitory, computer-readable media of claim 1, wherein the one or more configuration messages are to configure the UE to avoid radio link monitoring in an inactive bandwidth part.

7. The one or more non-transitory, computer-readable media of claim 1, wherein the one or more configuration messages are to configure the UE to perform measurements of type A or B on the SSB within the active BWP.

8. An apparatus to be implemented in a next-generation NodeB (gNB), the apparatus comprising:
    baseband circuitry to:
        identify an active bandwidth part (BWP) to be used by a user equipment (UE);
        determine whether the active BWP is to cover a synchronization signal block (SSB) to be transmitted by a target cell and that is to serve as a basis for a measurement performed by the UE within a measurement period; and generate one or more configuration messages to configure the UE to perform intra-frequency measurements on the SSB with or without a measurement gap based on the determination of whether the active BWP is to cover the SSB transmitted by the target cell; and interface circuitry coupled with the baseband circuitry to cause transmission of the one or more configuration message to the UE.

9. The apparatus of claim 8, wherein the one or more configuration messages are to configure the UE to perform the intra-frequency measurements as type-C measurements on the SSB with a measurement gap based on a determination that the active BWP is to be switched to not cover the SSB during the measurement period.

10. The apparatus of claim 9, wherein the active BWP is on a first set of physical resource blocks (PRBs) for a first time period and a second set of PRBs for a second time period, and the SSB is on PRBs within the first set of PRBs within the second time period.

* * * * *